United States Patent [19]
Milton et al.

[11] Patent Number: 5,855,451
[45] Date of Patent: Jan. 5, 1999

[54] COUPLING BETWEEN STEERING WHEEL AND STEERING SHAFT

[75] Inventors: Thomas James Milton; Michael James Wolohan, both of Bay City, Mich.

[73] Assignee: General Motors Corporation, Detroit, Mich.

[21] Appl. No.: 845,251

[22] Filed: Apr. 21, 1997

[51] Int. Cl.[6] ........................................ F16B 2/06
[52] U.S. Cl. ............................ 403/348; 403/328; 74/552
[58] Field of Search .................................. 403/348, 349, 403/350, 325, 326, 327, 328, 375; 74/552, 493; 280/779

[56] References Cited

U.S. PATENT DOCUMENTS

| | | | |
|---|---|---|---|
| 1,210,157 | 12/1916 | Fahnestock | 74/552 |
| 1,438,004 | 12/1922 | Vincent . | |
| 1,600,456 | 9/1926 | Diekmann . | |
| 1,640,763 | 8/1927 | Geyer et al. . | |
| 1,852,071 | 4/1932 | Becker | 403/328 X |
| 2,009,371 | 7/1935 | Junge | 403/328 |
| 2,193,223 | 3/1940 | Chayne et al. | 74/552 X |
| 3,827,816 | 8/1974 | Knapp et al. | 403/325 X |
| 4,615,191 | 10/1986 | Grandy | 403/349 X |
| 4,884,469 | 12/1989 | Wrigley | 74/552 |
| 4,892,007 | 1/1990 | Haldric et al. | 74/552 |
| 4,901,544 | 2/1990 | Jang | 74/552 X |
| 4,916,971 | 4/1990 | Haldric et al. | 74/552 |
| 5,421,053 | 6/1995 | Chodak | 403/327 X |

FOREIGN PATENT DOCUMENTS

| | | | |
|---|---|---|---|
| 77281 | 4/1987 | Japan | 74/552 |
| 6239243 | 8/1994 | Japan | 74/552 |

*Primary Examiner*—Harry C. Kim
*Attorney, Agent, or Firm*—Saul Schwartz; Dean L. Ellis

[57] ABSTRACT

A coupling between a motor vehicle steering shaft and a motor vehicle steering wheel including a first coupling element on the steering wheel having a cavity therein, a second coupling element on the steering shaft plugged into the cavity in the first coupling element, and a latch responsive to relative rotation between the first and the second coupling elements to couple together for unitary rotation the first and the second coupling elements with substantially zero lash therebetween. The latch includes a plurality of lugs on the second coupling element seated in extensions of the cavity in the first coupling element, a plurality of ramps in the cavity extensions operative to eject the lugs from the cavity extensions concurrent with relative rotation between the first and the second coupling elements, a plurality of sockets in the first coupling element, and a plurality of springs operative to thrust the lugs into corresponding ones of the sockets. The sockets and the lugs are shaped to wedge together to eliminate dimensional clearance, i.e., lash, which would otherwise permit relative rotation and relative linear translation between the first and the second coupling elements.

5 Claims, 5 Drawing Sheets

COUPLING BETWEEN STEERING WHEEL AND STEERING SHAFT

TECHNICAL FIELD

This invention relates to a coupling between a motor vehicle steering shaft and a motor vehicle steering wheel.

BACKGROUND OF THE INVENTION

Commonly, a motor vehicle steering wheel is retained on the end of a motor vehicle steering shaft by a nut on the shaft clamped against the center of the steering wheel. The nut in the center of the steering wheel complicates the task of accommodating additional elements on the steering wheel, e.g., supplemental inflation restraint apparatus, and delays the attachment of such additional elements until after the steering wheel is mounted on the steering shaft and secured by the nut. U.S. Pat. No. 5,536,106, issued Jul. 16, 1996 and assigned to the assignee of this invention, describes a coupling between a motor vehicle steering shaft and a motor vehicle steering wheel in which a plunger on the steering wheel snaps into a notch in the steering shaft when a polygonal-shaped end of the steering shaft is plugged into a correspondingly shaped socket in the steering wheel. A coupling according to this invention between a motor vehicle steering shaft and a motor vehicle steering wheel is a novel alternative to the coupling described in the aforesaid U.S. Pat. No. 5,536,106.

SUMMARY OF THE INVENTION

This invention is a new and improved coupling between a motor vehicle steering shaft and a motor vehicle steering wheel including a first coupling element on the steering wheel having a cavity therein, a second coupling element on the steering shaft plugged into the cavity in the first coupling element, and a latch responsive to relative rotation between the first and the second coupling elements about a longitudinal centerline of the steering shaft to couple together for unitary rotation the first and the second coupling elements with substantially zero lash therebetween. The latch includes a plurality of lugs on the second coupling element seated in extensions of the cavity in the first coupling element, a plurality of ramps in the cavity extensions operative to eject the lugs from the cavity extensions concurrent with relative rotation between the first and the second coupling elements, a plurality of sockets in the first coupling element, and a plurality of springs operative to thrust the lugs into corresponding ones of the sockets when the lugs achieve angular registry with the sockets. The sockets and the lugs are shaped to wedge together to eliminate dimensional clearance, i.e., lash, between the first and the second coupling elements which would otherwise permit relative rotation about and relative linear translation in the direction of the longitudinal centerline of the steering shaft.

DESCRIPTION OF THE PREFERRED EMBODIMENT

Figure 1:
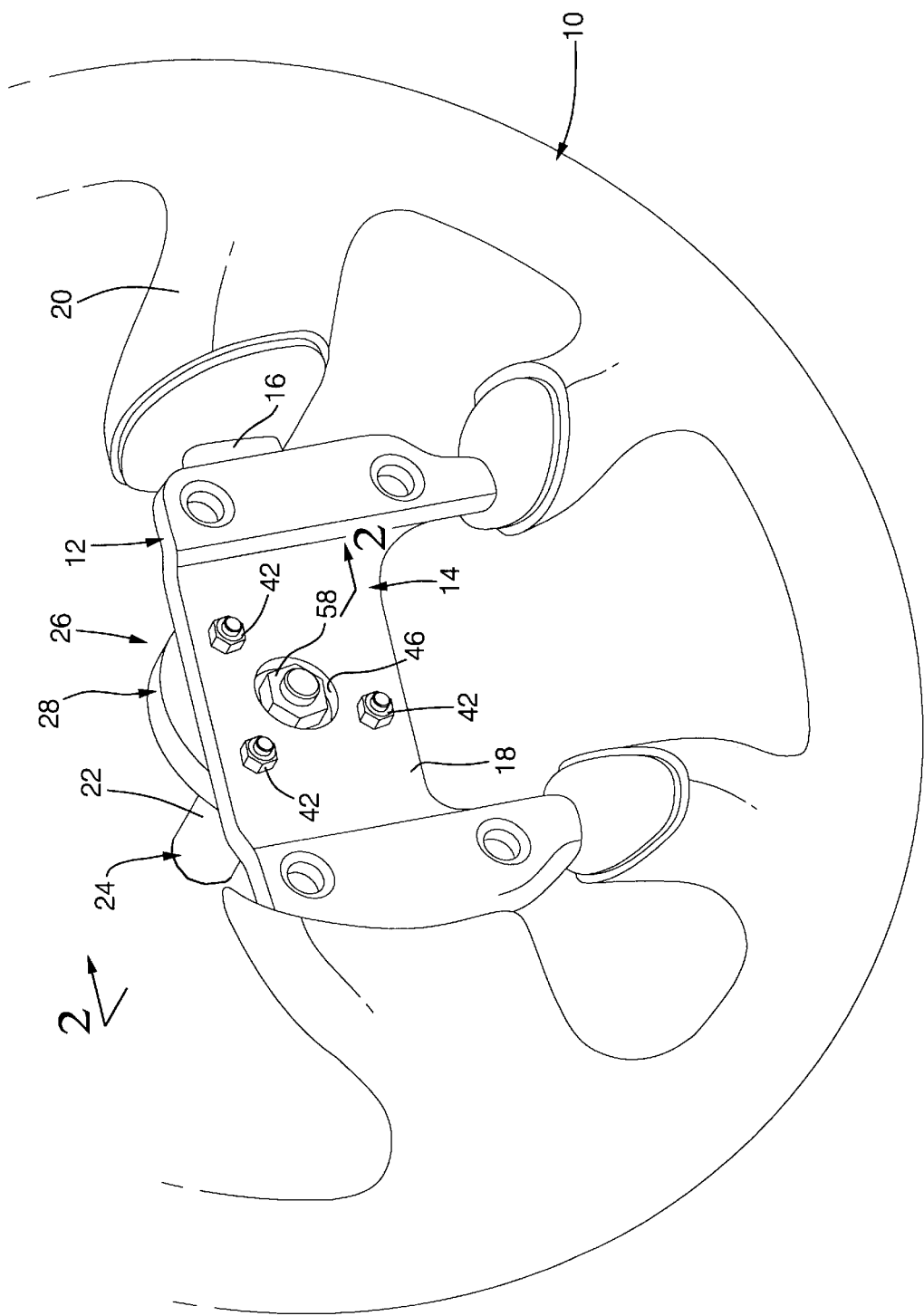
FIG. 1 is a fragmentary perspective view of a motor vehicle steering wheel coupled to a motor vehicle steering shaft by a coupling according to this invention.
Figure 6:
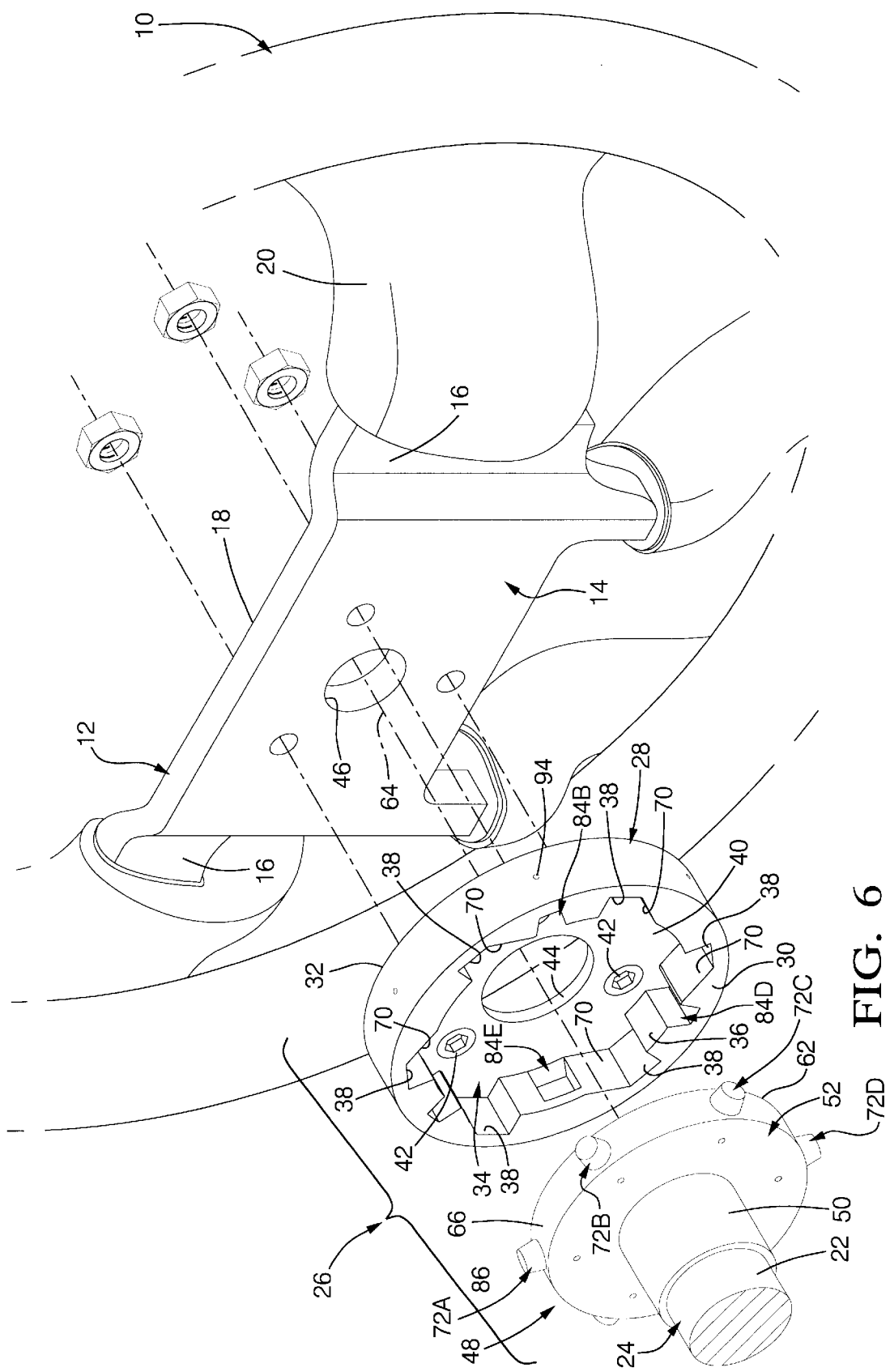
FIG. 6 is an exploded perspective view of the coupling according to this invention.

As seen best in FIGS. 1 and 6, a fragmentarily illustrated motor vehicle steering wheel 10 includes a rigid structural element 12 having a planar segment 14 in the middle of the steering wheel and a pair of integral spokes 16 radiating outward from the planar segment toward a rim, not shown, of the structural element. A surface 18 of the planar segment 14 faces toward a driver, not shown. The spokes 16 and the rim are concealed by an elastomeric cushion 20 molded around the structural element 12. A supplemental inflation restraint module, not shown, attaches to the planar segment 14 over the surface 18 thereof. The steering wheel 10 is coupled to a distal end 22 of a motor vehicle steering shaft 24 by a coupling 26 according to this invention.

A disc-shaped first coupling element 28 of the coupling 26 has an exposed first planar side 30 and a second planar side 32 seated flush against a surface of the planar segment 14 of the structural element 12 of the steering wheel facing in the opposite direction from the surface 18. A cavity 34 in the first coupling element 28 open through the exposed planar side 30 of the latter has an inside cylindrical wall 36, a plurality of symmetrically arrayed rectangular extensions 38, and a circular base 40. The first coupling element 28 is rigidly clamped to the planar segment 14 of the steering wheel 10 by a plurality of fasteners 42 in recesses in the base 40 with a center aperture 44 in the base aligned with a center aperture 46 in the planar segment 14.

A second coupling element 48 of the coupling 26 includes a tubular stem 50 and an integral disc-shaped body 52. The distal end 22 of the steering shaft 24 fits in the tubular stem 50 with an inside shoulder 54 on the stem seated against an outside shoulder 56 on the steering shaft. A nut 58 on a screw thread 60 at the distal end of the steering shaft seats against a first planar side 62 of the body 52 of the second coupling element whereby the second coupling element is rigidly clamped to the steering shaft 24 for rotation as a unit with the shaft about a longitudinal centerline 64 thereof and for linear translation therewith in the direction of the longitudinal centerline 64.

The disc-shaped body 52 of the second coupling element 48 is plugged into the cavity 34 in the first coupling element 28 until the planar side 62 of the disc-shaped body bears flush against the base 40 of the cavity with the nut 58 on the steering shaft nested in the aperture 46 in the planar segment 14. In that circumstance, the centerline 64 of the steering shaft 24 is perpendicular to the planar segment 14 of the structural element 12 of the steering wheel. An outside cylindrical wall 66 of the disc-shaped body 52 cooperates with the inside cylindrical wall 36 of the cavity 34 in supporting the first coupling element 28 on the second coupling element 48 for relative rotation about the longitudinal centerline 64 of the steering shaft.

A latch 68 between the first and the second coupling elements 28, 48 includes a plurality of ramps 70 defining oblique sides of the rectangular extensions 38 of the cavity 34 in the first coupling element. A plurality of lugs 72A–72F of the latch 68 are supported for radial linear translation in a corresponding plurality of symmetrically arrayed radial bores 74 in the disc-shaped body 52 of the second coupling element 48. A lateral stop pin 76 on each lug 72A–72F has an end slidably disposed in a radial slot 78 in the first planar side 62 of the disc-shaped body 52. The lateral pins 76 cooperate with the outboard ends of the radial slots 78 in defining an extended position, FIGS. 2, 3, 5A and 6, of each of the lugs 72A–72F in which each lug radially overlaps the outside cylindrical wall 66 of the disc-shaped body 52 and seats in a corresponding one of the rectangular extensions 38 of the cavity 34. A spring 82 in each radial bore 74 thrusts the corresponding lug 72A–72F toward its extended position.

Figure 5A:
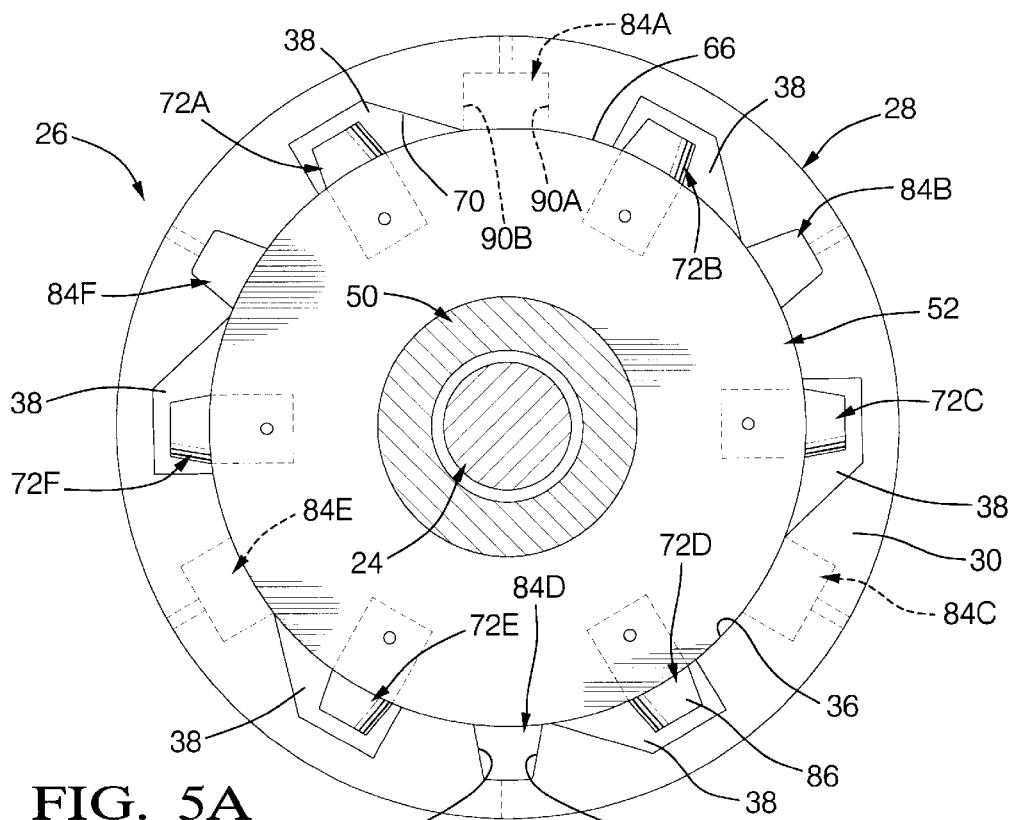
FIGS. 5A–5B are similar to FIG. 3 but showing elements of the coupling according to this invention in different relative positions.
Figure 5B:
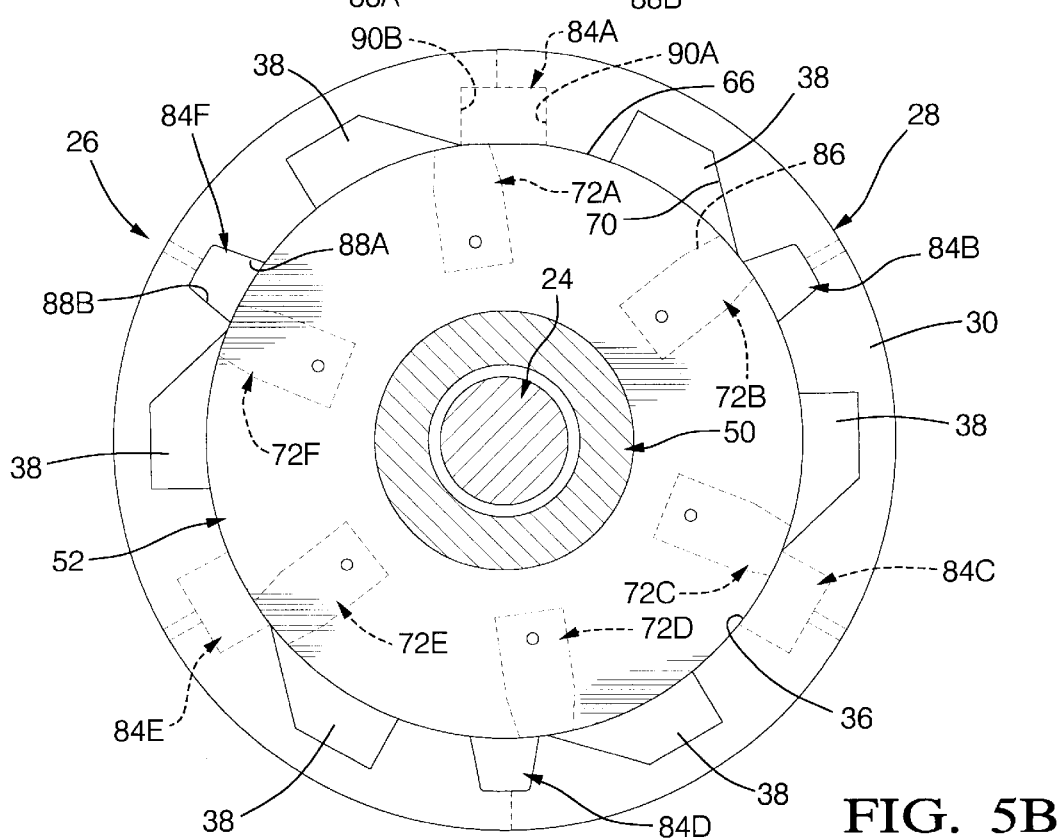

The latch 68 further includes a plurality of sockets 84A–84F in the first coupling element 28 each open through the inside cylindrical wall 36 of the cavity 34 adjacent to respective ones of the ramps 70. In addition to being 30 open through the inside cylindrical wall 36, each of the sockets 84B, 84D, 84F is also open through the planar side 30 of the first coupling element. When the first coupling element 28 is rotated counterclockwise, FIG. 5A, relative to the second coupling element 48, the ramps 70 engage the outboard ends of corresponding ones of the lugs 72A–72F and stroke the lugs inward against the springs 82 until the lugs are ejected from the rectangular extensions 38, FIG. 5B. When the lugs 72A–72F thereafter achieve registry with adjacent ones of the sockets 84A–84F, the springs 82 thrust the lugs outward into the sockets toward the extended positions of the lugs.

Figure 2:
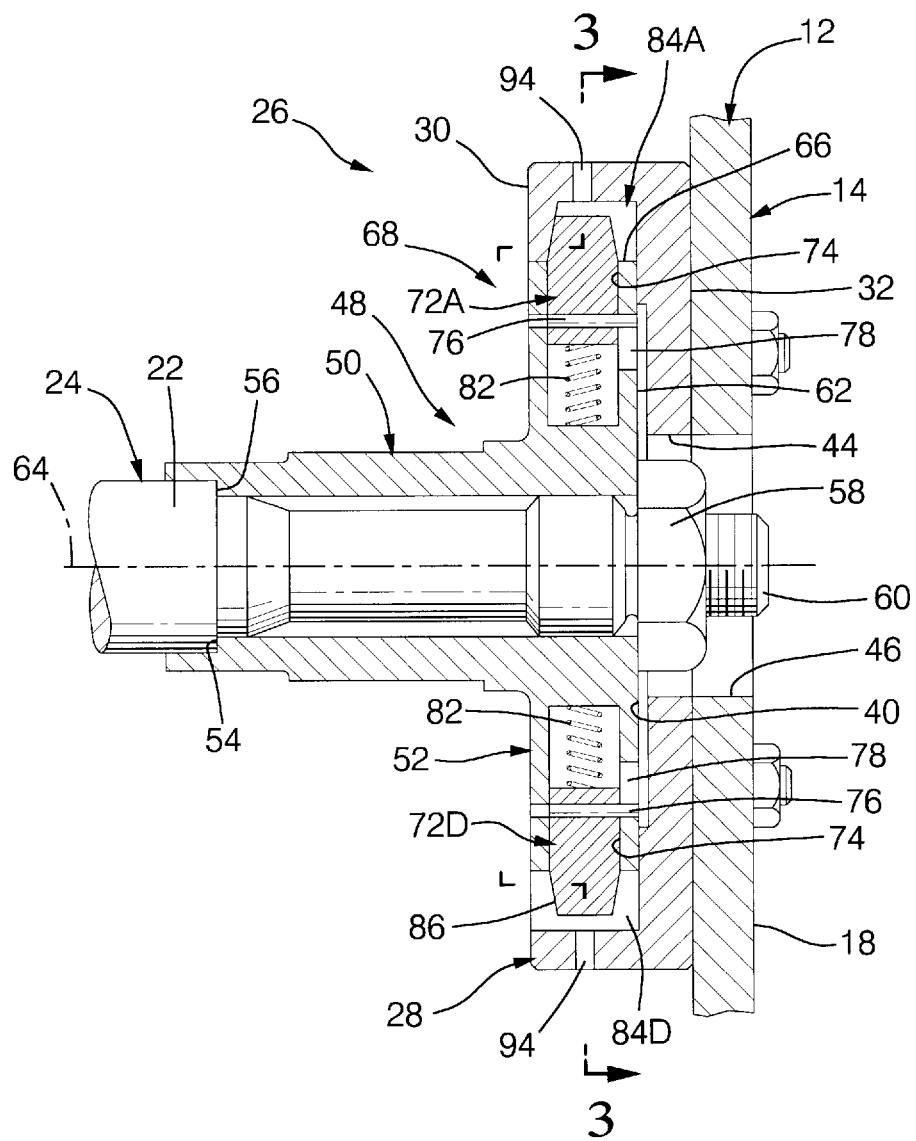
FIG. 2 is an enlarged sectional view taken generally along the plane indicated by lines 2—2 in FIG. 1.
Figure 3:
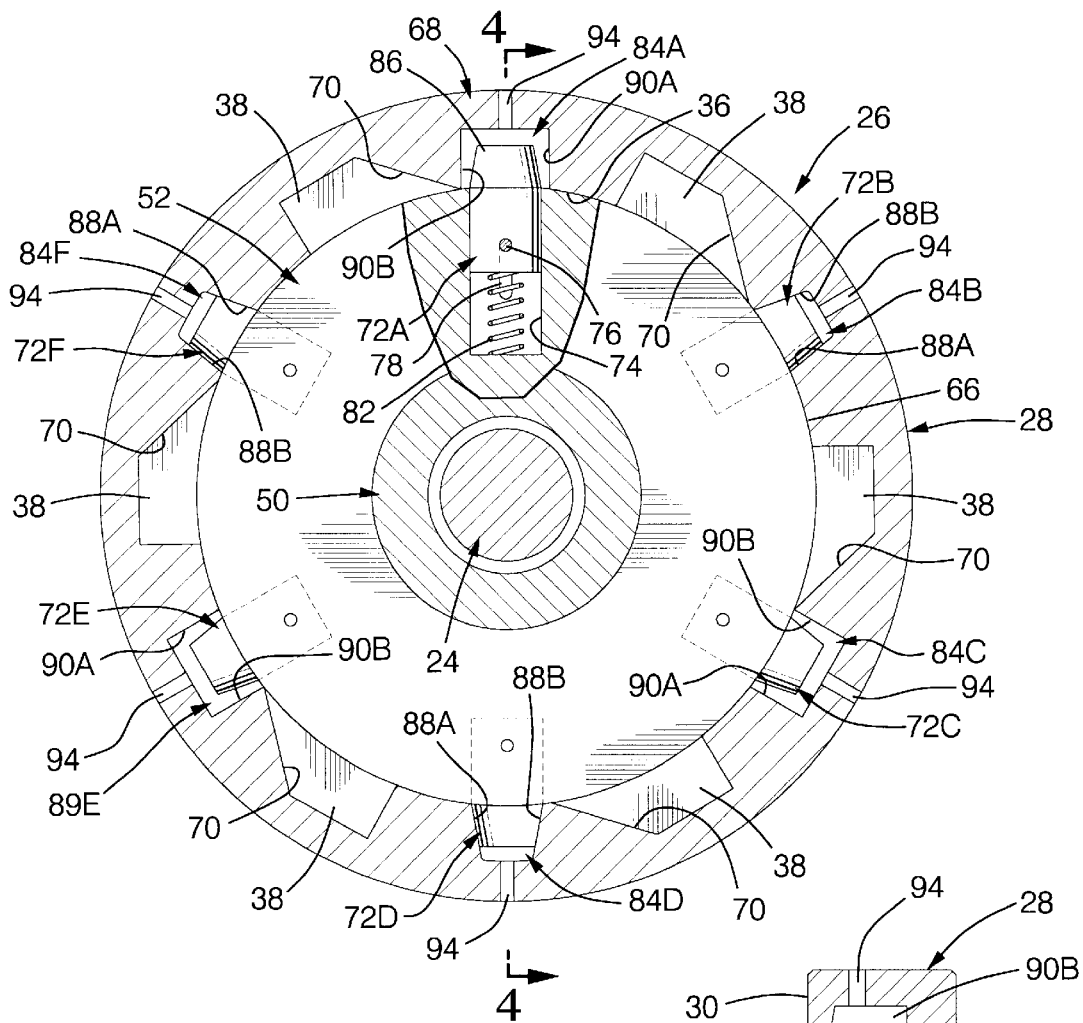
FIG. 3 is a sectional view taken generally along the plane indicated by lines 3—3 in FIG. 2.
Figure 4:
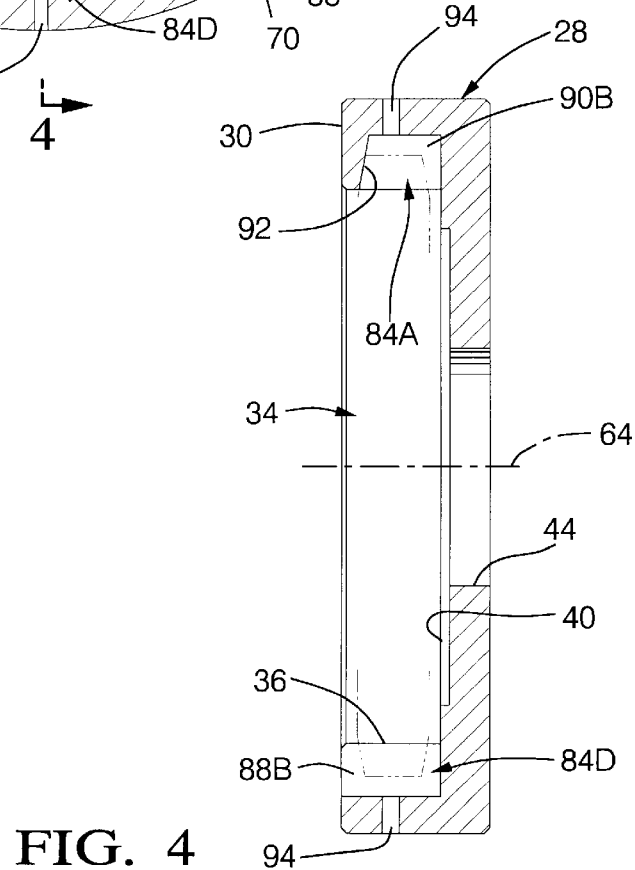
FIG. 4 is a sectional view taken generally along the plane indicated by lines 4—4 in FIG. 3.

As seen best in FIGS. 2–4, each of the lugs 72A–72F has a frustoconical shoulder 86 thereon exposed beyond the outside cylindrical wall 66 of the disc-shaped body 52 in the extended position of the lug. Each of the sockets 84B, 84D, 84F has a pair of oblique side walls 88A, 88B, the angle of convergence of which substantially matches the cone angle of the frustoconical shoulders 86 on the lugs 72A–72F. Each of the sockets 84A, 84C, 84E has a pair of straight side walls 90A, 90B and an overhanging wall 92, FIG. 4, oblique to longitudinal centerline 64 of the steering shaft 24 at an angle which substantially matches the cone angle of the frustoconical shoulders 86 on the lugs 72A–72F.

As the springs 82 thrust the lugs 72B, 72D, 72F radially outward in the sockets 84B, 84D, 84F, respectively, the frustoconical shoulders 86 on the lugs wedge between and tangent to the oblique side walls 88A, 88B of the sockets to eliminate dimensional clearance, i.e., lash, between the lugs and the sockets which would otherwise permit relative rotation between the first and the second coupling elements about the longitudinal centerline 64 of the steering shaft. Similarly, as the springs 82 thrust the lugs 72A, 72C, 72E radially outward in the sockets 84A, 84C, 84E, respectively, the frustoconical shoulders 86 on the lugs wedge against and tangent to the oblique overhanging walls 92 of the sockets to eliminate dimensional clearance, i.e., lash, between the lugs and the sockets which would otherwise permit relative linear translation between the first and the second coupling elements in the direction of the longitudinal centerline 64 of the steering shaft.

In operation, after the second coupling element 48 is plugged into the first coupling element 28 and rotated to effect registry between the lugs 72A–72F and the sockets 84A–84F, the lugs couple together the first and the second coupling elements for unitary rotation about the longitudinal centerline 64 of the steering shaft so that manual effort applied at the steering wheel 10 is transferred by the steering shaft 24 to a steering gear, not shown, of the motor vehicle. The cone angle of the frustoconical shoulders 86 is selected to prevent the lugs from being cammed out of the sockets 84A–84F. Importantly, because access to the middle of the side of the steering wheel 10 facing a driver is not required in order to couple the steering wheel to the steering shaft, elements such as supplemental inflation restraint apparatus may be installed on the steering wheel before the latter is coupled to the steering shaft.

In the event that removal of the steering wheel 10 from the steering shaft 24 is desired, a tool, not shown, is inserted in each of a plurality of radial apertures 94 in the outside cylindrical wall 66 of the second coupling element outboard of the lugs 72A–72F to eject the lugs from the sockets 84A–84F. The first and second coupling elements are then rotated relative to each other about the longitudinal centerline 64 of the steering shaft until the lugs register with and are thrust by the springs 82 into the rectangular extensions 38 of the cavity 34. The first coupling element is then unplugged from the cavity 34 in the second coupling element to separate the steering wheel from the steering shaft.

We claim:

1. A coupling between a motor vehicle steering shaft and a motor vehicle steering wheel comprising:

a first coupling element rigidly attached to a first one of said steering shaft and said steering wheel, a second coupling element on a second one of said steering shaft and said steering wheel plugged into a cavity in said first coupling element whereby said first and said second coupling elements are rotatable relative to each other about a longitudinal centerline of said steering shaft, and a latch means responsive to relative rotation between said first and said second coupling elements about said longitudinal centerline of said steering shaft to couple together said first and said second coupling elements, said latch means including members engageable with substantially zero lash to prevent relative rotation in either sense of direction and relative translation in either sense of direction of said first and second coupling elements about and along said longitudinal centerline of said steering shaft.

2. The coupling recited in claim 1 wherein said latch means responsive to relative rotation between said first and said second coupling elements about said longitudinal centerline of said steering shaft to couple together said first and said second coupling elements comprises:

an extension of said cavity in said first coupling element, a lug supported on said second coupling element for radial reciprocation relative to said longitudinal centerline of said steering shaft having an extended position projecting into said extension of said cavity in said first coupling element, a spring biasing said lug toward said extended position thereof, a ramp on said first coupling element in said extension of said cavity therein engageable on an end of said lug and operative to eject said lug from said extension in response to relative rotation between said first and said second coupling elements, a socket in said first coupling element open to said cavity in said first coupling element so that said spring thrusts said lug into said socket toward said extended position of said lug when said lug registers with said socket, and wall means in said socket and on said lug wedged together when said spring thrusts said lug into said socket toward said extended position of said lug and operative when wedged together to eliminate lash between said lug and said socket.

3. The coupling recited in claim 2 wherein said wall means comprises:

a frustoconical shoulder on said lug, and a pair of converging side walls in said socket having an angle of convergence corresponding to the cone angle of said frustoconical shoulder on said lug.

4. The coupling recited in claim 2 wherein said wall means comprises:

a frustoconical shoulder on said lug, and an overhanging side wall in said socket oblique to said longitudinal centerline of said steering shaft at an angle relative to said longitudinal centerline of said steering shaft corresponding to the cone angle of said frustoconical shoulder on said lug.

5. A coupling between a motor vehicle steering shaft and a motor vehicle steering wheel comprising:

a first coupling element rigidly attached to a first one of said steering shaft and said steering wheel, a second coupling element on a second one of said steering shaft and said steering wheel plugged into a cavity in said first coupling element whereby said first and said second coupling elements are rotatable relative to each other about a longitudinal centerline of said steering shaft, a first extension of said cavity in said first coupling element, a second extension of said cavity in said first coupling element, a first lug supported on said second coupling element for radial reciprocation relative to said longitudinal centerline of said steering shaft having an extended position projecting into said first extension of said cavity in said first coupling element, a second lug supported on said second coupling element for radial reciprocation relative to said longitudinal centerline of said steering shaft having an extended position projecting into said second extension of said cavity in said first coupling element, a spring means biasing each of said first and said second lugs toward said extended positions thereof, a first ramp on said first coupling element in said first extension of said cavity therein engageable on an end of said first lug and operative to eject said first lug from said first extension in response to relative rotation between said first and said second coupling elements, a second ramp on said first coupling element in said second extension of said cavity therein engageable on an end of said second lug and operative to eject said second lug from said second extension in response to relative rotation between said first and said second coupling elements, a first socket in said first coupling element open to said cavity in said first coupling element so that said spring means thrusts said first lug into said first socket toward said extended position of said first lug when said first lug registers with said first socket, a second socket in said first coupling element open to said cavity in said first coupling element so that said spring means thrusts said second lug into said second socket toward said extended position of said second lug when said second lug registers with said second socket, a frustoconical shoulder on said first lug, a pair of converging side walls in said first socket having an angle of convergence corresponding to the cone angle of said frustoconical shoulder on said first lug so that said converging side walls wedge together with said frustoconical shoulder to eliminate lash between said first lug and said first socket which would otherwise permit relative rotation between said first and said second coupling elements about said longitudinal centerline of said steering shaft, a frustoconical shoulder on said second lug, and an overhanging side wall in said second socket oblique to said longitudinal centerline of said steering shaft at an angle relative to said longitudinal centerline of said steering shaft corresponding to the cone angle of said frustoconical shoulder on said lug so that said overhanging side wall wedges together with said frustoconical shoulder to eliminate lash between said second lug and said second socket which would otherwise permit relative linear translation between said first and said second coupling elements in the direction of said longitudinal centerline of said steering shaft.

* * * * *